US012203421B1

(12) United States Patent
Lai

(10) Patent No.: US 12,203,421 B1
(45) Date of Patent: Jan. 21, 2025

(54) FUEL GAS VALVE APPLICABLE TO NATURAL GAS AND LIQUEFIED PETROLEUM GAS

(71) Applicant: HWEI KEH ENTERPRISE CO., LTD., Taichung (TW)

(72) Inventor: Jih-Ching Lai, Taichung (TW)

(73) Assignee: HWEI KEH ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 18/516,962

(22) Filed: Nov. 22, 2023

(51) Int. Cl.
*F02D 19/06* (2006.01)

(52) U.S. Cl.
CPC ..... *F02D 19/0607* (2013.01); *F02D 19/0647* (2013.01); *F02D 19/0678* (2013.01)

(58) Field of Classification Search
CPC ............. F02D 19/0607; F02D 19/0647; F02D 19/0678; F16K 31/485; F16K 31/48; F23C 1/08; F23D 23/00
See application file for complete search history.

(56) References Cited

U.S. PATENT DOCUMENTS 2,928,382 A * 3/1960 Hans ................... F02D 19/0607 123/27 GE
2014/0072919 A1* 3/2014 Deng ...................... F23N 1/022 431/278

FOREIGN PATENT DOCUMENTS

CN 116877730 A * 10/2023

* cited by examiner

*Primary Examiner* — Syed O Hasan
(74) *Attorney, Agent, or Firm* — Leong C. Lei

(57) ABSTRACT

A fuel gas valve applicable to natural gas and liquefied petroleum gas including a valve body having a flow channel having a valve opening, an inlet opening, and an outlet opening; a top cover mounted to the valve body and having a mounting hole, a small flame limiting portion, and a large flame limiting portion; a sealing gasket interposed between the valve body and the top cover and having a deformable portion; a regulation device disposed in the mounting hole and including an intermediary member, a pin axle, a spring, a fine adjustment knob, a plug axle unit, and a dual-spring unit; a drive interface including a limiting projection and connected to the intermediary member for driving the regulation device to change a gap between the plug axle unit and the valve opening to regulate the flow rate of fuel gas passing through the valve opening for adjusting a flame.

7 Claims, 14 Drawing Sheets

FUEL GAS VALVE APPLICABLE TO NATURAL GAS AND LIQUEFIED PETROLEUM GAS

BACKGROUND OF THE INVENTION

(a) Technical Field of the Invention

The present invention relates to a fuel gas valve, and more particularly to a fuel gas valve that is applicable to natural gas (NG) and liquefied petroleum gas (LPG).

(b) Description of the Prior Art

A fuel gas valve is used to open or close a flow of fuel gas passing therethrough and to regulate the flow (in order to make switching between strong and weak flames).

Fuel gas that is commonly used in daily living generally includes two kinds, which are liquefied petroleum gas (LPG) and natural gas (NG). Fuel valves for use with the two kinds of fuel gas are structurally different because for natural gas, the fuel gas inlet pressure is generally smaller than the inlet pressure of the liquefied petroleum gas, and correspondingly, the outlet pressure of the natural gas is smaller than the outlet pressure of the liquefied petroleum gas. As the fuel gas valves for natural gas and liquefied petroleum gas have to support different gas pressures and different burning efficiencies, fuel gas valves that are currently available in the market are grouped into two structures to respectively correspond to and use with natural gas and liquefied petroleum gas.

For the manufacturers, two fuel gas valve specifications often result in excessive inventory as well as other issues. Therefore, a single fuel valve structure applicable to both natural gas and liquefied petroleum gas is currently available and this helps reduce difficulties associated with procurement and installation. However, the fuel gas valve that is currently available for application to both natural gas and liquefied petroleum gas has a complicated structure, involves a large number of parts, requires a high production cost, and is difficult to assemble, and is also difficult for operation.

SUMMARY OF THE INVENTION

In view of the above, the present invention is made to alleviate the problems of the prior art that the known fuel gas valve applicable to both natural gas and liquefied petroleum gas has a complicated structure, involves a large number of parts, requires a high production cost, and is difficult to assemble and also difficult to operate.

An objective of the present invention is to provide a fuel gas valve that is applicable to natural gas and liquefied petroleum gas and has a simple structure, involves a reduced number of parts, is easy to assemble and operate and can effectively reduce the production cost.

Another objective of the present invention is to provide a fuel gas valve that is applicable to natural gas and liquefied petroleum gas and is operable to regulate a flow channel volumetric size for fuel gas flowing through a valve opening, in order to achieve an effect of changing an outlet pressure.

For such objectives, the present invention provides a fuel gas valve applicable to natural gas and liquefied petroleum gas, comprising: a valve body, which comprises a flow channel formed in an interior thereof, an inlet opening adapted to communicate the flow channel with an outside, and an outlet opening adapted to communicate the flow channel with the outside in order to allow a fuel gas to flow in through the inlet opening to pass through the flow channel to then flow out of the outlet opening, a valve opening being arranged in an interior of the flow channel; a top cover, which is mounted on the valve body and comprises a mounting hole, a small flame limiting portion, and a large flame limiting portion, the mounting hole being formed with a top-cover internal thread; a sealing gasket, which is interposed between the valve body and the top cover, the sealing gasket comprising a deformable portion located in the flow channel; a regulation device, which comprises an intermediary member, a pin axle, a spring, a fine adjustment knob, a plug axle unit, and a dual-spring unit, wherein the intermediary member is formed with an axle hole penetrating therethrough in an axial direction, the axle hole being formed, on an inside wall surface thereof, with an intermediary-member internal thread, the intermediary member being formed, on an external circumferential surface, with an intermediary-member external thread and an intermediary-member external circumferential toothed portion, the intermediary member being located in the mounting hole by having the intermediary-member external thread screwed to the top-cover internal thread, the pin axle being formed, in a middle section thereof, with a circumferential protrusion portion protruded in an annular form, the pin axle being located in the axle hole of the intermediary member, the spring being located in the axle hole of the intermediary member and having a top end supported on a bottom surface of the circumferential protrusion portion of the pin axle and a bottom end supported on an internal wall of the intermediary member to provide the pin axle with an upward-biasing elastic preloading force, the fine adjustment knob comprising a fine-adjustment-knob external thread, the fine-adjustment-knob external thread being screwed to the intermediary-member internal thread to have the fine adjustment knob located inside the axle hole and contact a top surface of the circumferential protrusion portion of the pin axle to limit a highest position of the pin axle, the plug axle unit being located in the valve opening of the valve body, the plug axle unit having an external circumferential surface that comprises a closure face, the dual-spring unit comprising an upper holding plate, a lower holding plate, an external spring, and an internal spring, the upper holding plate being supported on a bottom end of the pin axle, the lower holding plate being mounted to a top end of the plug axle unit, the lower holding plate and the plug axle unit jointly clamping a deformable portion of the sealing gasket therebetween, the external spring being connected between the upper holding plate and the lower holding plate, the internal spring being located in an interior of the external spring, a bottom end of the internal spring being supported on the lower holding plate; a drive interface, which is disposed on the top cover and comprises a limiting projection, the drive interface being connected to the intermediary member of the regulation device to drive the regulation device to move upwards and downwards for changing a size of a gap between the closure face of the plug axle unit and the valve opening to adjust a flow rate of the fuel gas flowing through the valve opening for adjustment between a small flame and a large flame, the small flame limiting portion and the large flame limiting portion of the top cover being located in a rotation path of the limiting projection; and a switching device, which comprises an external knob and an internal knob, an external circumferential surface of the external knob being formed with an external-knob external thread, an internal circumferential surface of the external knob being formed with an external-knob internal thread, the internal knob comprising an internal-knob external thread, the internal-knob external thread being screwed to the external-knob internal thread to couple the internal knob in an interior of the external knob, the switching device being selectively detachable for rearrangement to have the external-knob external thread screwed to the intermediary-member internal thread of the intermediary member, such that the switching device, when coupled with the intermediary member, drives the pin axle and the external spring and the internal spring to be pressed for downward moving to cause deformation of the deformable portion of the sealing gasket to change a volume of the flow channel to achieve adjustment of a pressure of the fuel gas flowing out of the outlet opening, so that an effect of being applicable to both natural gas and liquefied petroleum gas is realized, achieving the advantage of reducing components, simplifying structure complication, lowering production cost, easing assembling, and making operation easy.

DETAILED DESCRIPTION OF THE PREFERRED EMBODIMENTS

Figure 1:
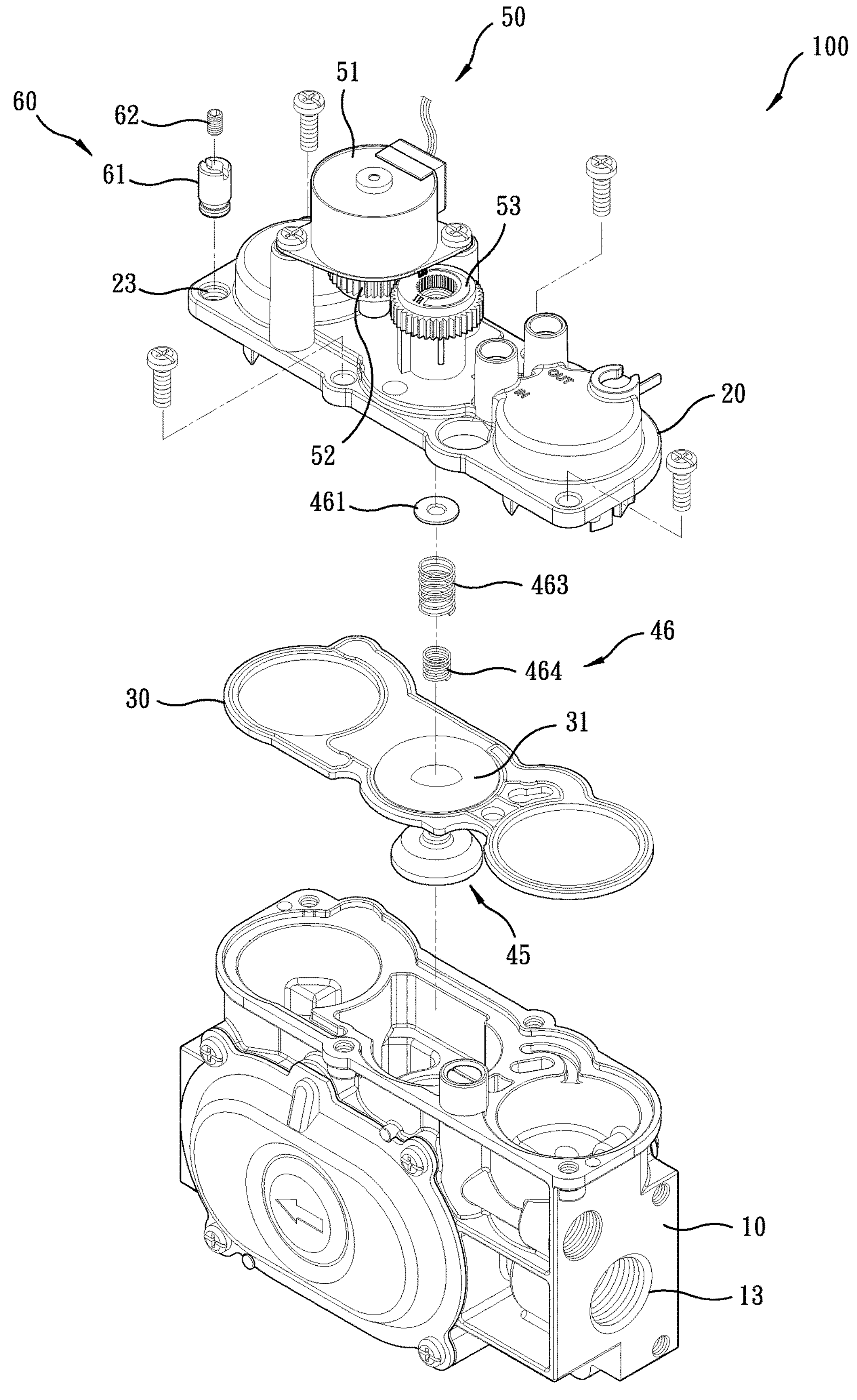
FIG. 1 is an exploded view showing a first preferred embodiment of the present invention.

Referring to FIGS. 1-11, a fuel gas valve 100 applicable to natural gas and liquefied petroleum gas according to a first preferred embodiment of the present invention comprises a valve body 10, a top cover 20, a sealing gasket 30, a regulation device 40, a drive interface 50, and a switching device 60.

Referring to FIGS. 1-9, the valve body 10 comprises a flow channel 11 formed in an interior thereof, an inlet opening 12 communicating the flow channel 11 with the outside, and an outlet opening 13 communicating the flow channel 11 with the outside. The inlet opening 12 functions to receive fuel gas to flow inward so that the fuel gas may pass through the flow channel 11 to flow out through the outlet opening 13. A valve opening 14 is arranged in an interior of the flow channel 11.

Referring to FIGS. 1-9, the top cover 20 is securely mounted on the valve body 10. The top cover 20 includes a mounting hole 21 that penetrates therethrough from a top to a bottom thereof and a limiting block 22 arranged at a peripheral position of the mounting hole 21. The mounting hole 21 is formed, in an interior thereof, with a top-cover internal thread 211. The limiting block 22 is formed with a small flame limiting portion 221 and a large flame limiting portion 222 respectively on two opposite sides thereof. The top cover 20 is formed with a receiving internal thread 23.

Referring to FIGS. 1-9, the sealing gasket 30 is interposed between the valve body 10 and the top cover 20 to prevent fuel gas from escaping from a combination site between the valve body 10 and the top cover 20. The sealing gasket 30 comprises a deformable portion 31 that is located in an interior of the flow channel 11.

Referring to FIGS. 1-9, the regulation device 40 comprises an intermediary member 41, a pin axle 42, a spring 43, a fine adjustment knob 44, a plug axle unit 45, and a dual-spring unit 46. The intermediary member 41 is formed with an axle hole 411 that penetrates therethrough in an axial direction. The axle hole 411 is formed, on an inside wall surface thereof, with an intermediary-member internal thread 412, and the intermediary member 41 is formed, on an external circumferential surface thereof, with an intermediary-member external thread 413 at a location adjacent to a lower end thereof and an intermediary-member external circumferential toothed portion 414 at a location adjacent to an upper end thereof. The intermediary member 41 is disposed in the mounting hole 21 of the top cover 20 by having the intermediary-member external thread 413 screwed to the top-cover internal thread 211. The pin axle 42 is formed, in a middle section thereof, with a circumferential protrusion portion 421 that is protruded in an annular form. The pin axle 42 is disposed in the axle hole 411 of the intermediary member 41. The spring 43 is disposed in the axle hole 411 of the intermediary member 41 with a top end thereof supported on a bottom surface of the circumferential protrusion portion 421 of the pin axle 42 and a bottom end thereof supported on an internal wall of the intermediary member 41 to provide the pin axle 42 with an upward-biasing elastic preloading force. The fine adjustment knob 44 comprises a fine-adjustment-knob external thread 441, and the fine-adjustment-knob external thread 441 is screwed to the intermediary-member internal thread 412 to have the fine adjustment knob 44 located inside the axle hole 411 and contact a top surface of the circumferential protrusion portion 421 of the pin axle 42 to limit a highest position of the pin axle 42. The plug axle unit 45 is located in the valve opening 14 of the valve body 10. The plug axle unit 45 comprises a regulation plug 451 and a connecting bar 452. The regulation plug 451 has an external circumferential surface that comprises a closure face 453. A bottom end of the connecting bar 452 is connected to a top surface of the regulation plug 451. The dual-spring unit 46 comprises an upper holding plate 461, a lower holding plate 462, an external spring 463, and an internal spring 464. The upper holding plate 461 abuts and is supported on a bottom end of the pin axle 42, and the lower holding plate 452 is fixedly mounted to a top end of the connecting bar 451 of the plug axle unit 45, and the lower holding plate 452 and the connecting bar 451 jointly clamp the deformable portion 31 of the sealing gasket 30 therebetween. The external spring 463 is supported and connecting between the upper holding plate 461 and the lower holding plate 462, and the internal spring 464 is received in an interior space of the external spring 463 in such a way that a bottom end of the internal spring 464 is supported on the lower holding plate 462.

Referring to FIGS. 1-9, the drive interface 50 is disposed on the top cover 20 and is connected to the intermediary member 41 of the regulation device 40 to drive the regulation device 40 to operate in order to regulate a flow rate of fuel gas flowing through the valve opening 14 of the valve body 10 for adjustment between small flame and large flame. In the instant embodiment, the drive interface 50 comprises a step motor 51, a driving gear 52, and a driven gear 53. The step motor 51 is disposed on the top cover 20 to provide a rotating power. The driving gear 52 is coupled to the step motor 51 to be driven by the step motor 52 to rotate. The driven gear 53 comprises an internal circumferential toothed portion 531, and the internal circumferential toothed portion 531 is in mating engagement with the intermediary-member external circumferential toothed portion 414 of the intermediary member 41. The driven gear 53 is in mating engagement with the driving gear 52. The driven gear 53 has a bottom surface that is provided with a limiting projection 532 at a non-center position. As such, the drive interface 50 provides a driving force for driving the regulation device 40 to operate, and the small flame limiting portion 221 and the large flame limiting portion 222 of the top cover 20 are located in a rotation path of the limiting projection 531.

Referring to FIGS. 1-11, the switching device 60 comprises an external knob 61 and an internal knob 62. An external circumferential surface of the external knob 61 is formed with an external-knob external thread 611, and an internal circumferential surface if the external knob 61 is formed with an external-knob internal thread 612. The internal knob 62 comprises an internal-knob external thread 621, and the internal-knob external thread 621 is screwed to the external-knob internal thread 612 to set and couple the internal knob 62 in an interior of the external knob 61. A user may selectively arrange the switching device 60 to screw in and couple with the intermediary-member internal thread 412 of the intermediary member 41 or to screw in and couple with the receiving internal thread 23 of the top cover 20.

Figure 4:
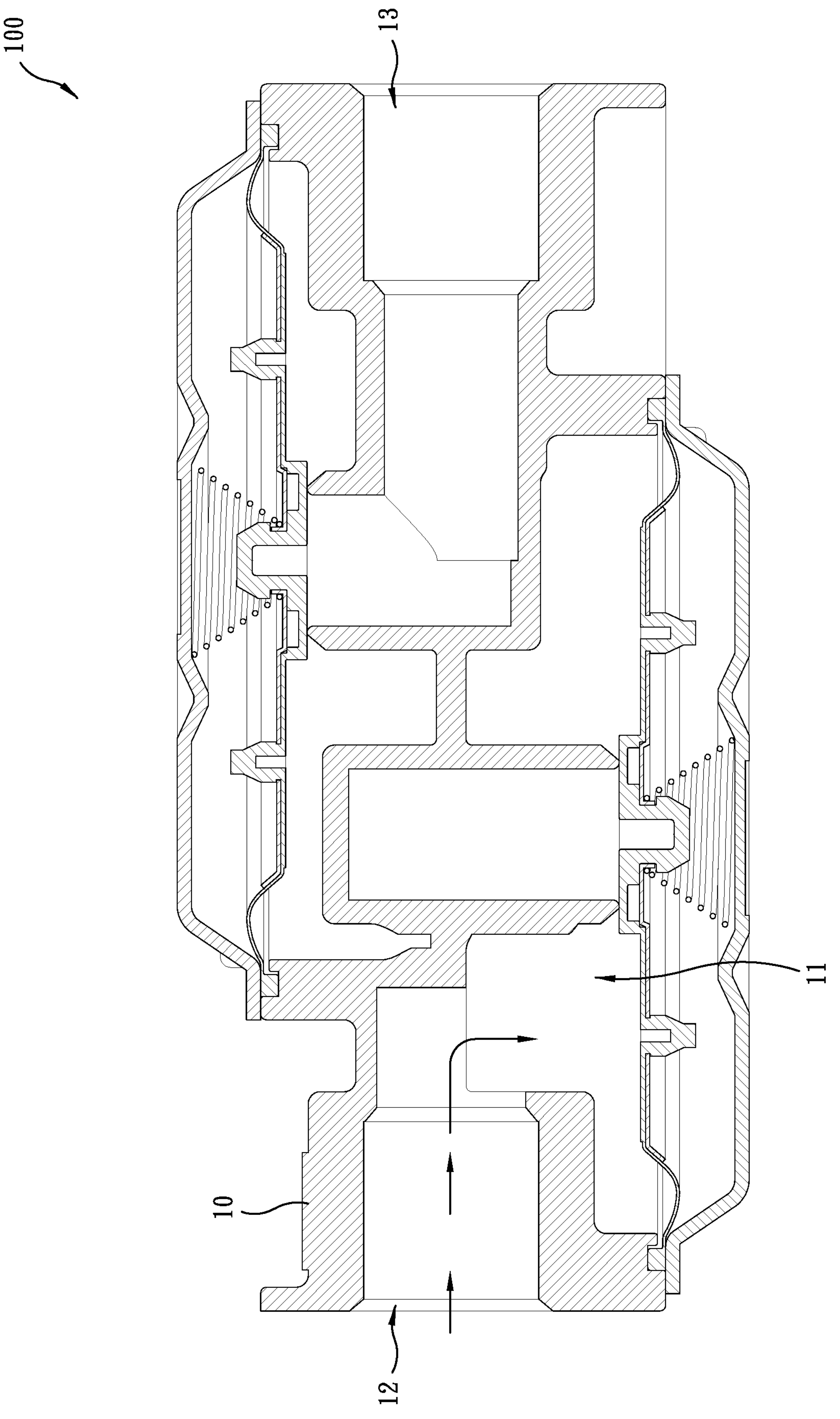
FIG. 4 is a cross-sectional view of the embodiment of FIG. 1, primarily for illustrating a flow channel closed condition.
Figure 5:
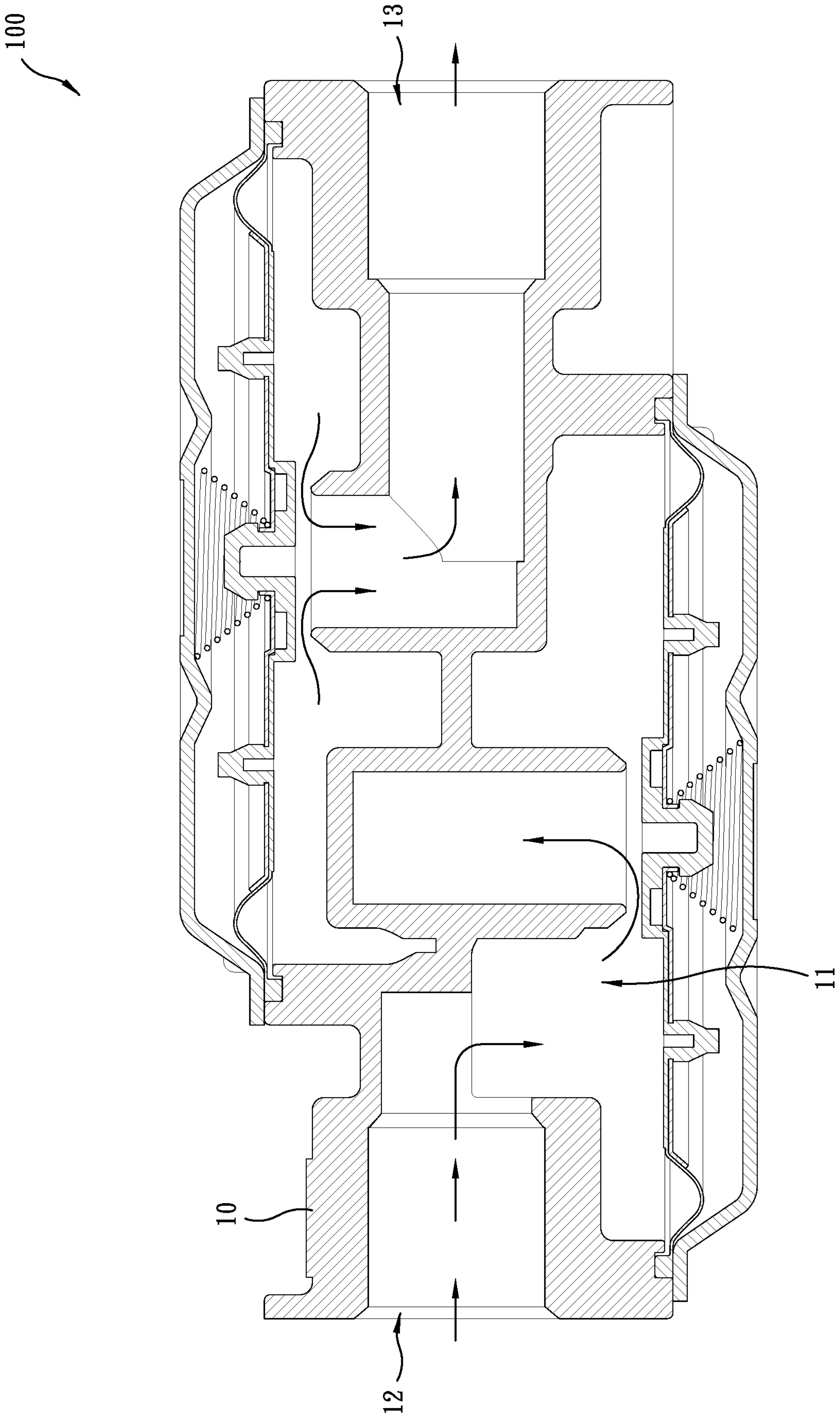
FIG. 5 is a cross-sectional view of the embodiment of FIG. 1, primarily for illustrating a flow channel opened condition.

Thus, the above provide a description to the components of the fuel gas valve 100 applicable to natural gas and liquefied petroleum gas according to the first preferred embodiment of the present invention and the way of assembling thereof, and features of operation thereof will be described below, with reference to examples that the fuel gas valve is operated with natural gas with a 7-inch water column gas pressure set at the inlet opening end and a 1.7 (small flame) to 3.5 (large flame) inch water column gas pressure set at the outlet opening end and that for operation with liquefied petroleum gas, the fuel gas valve is set with a 12-inch water column gas pressure at the inlet opening end thereof and a 5-5.5 (small flame) to 10-10.5 (large flame) inch water column gas pressure at the outlet opening end:

Firstly, the flow channel 11 of the valve body 10 is closable (as shown in FIG. 4) or openable (as shown in FIG. 5), such that when the flow channel 11 is closed, fuel gas is not allowed to pass therethrough, and when the flow channel 11 is opened, fuel gas is allowed to flow therethrough.

Figure 6:
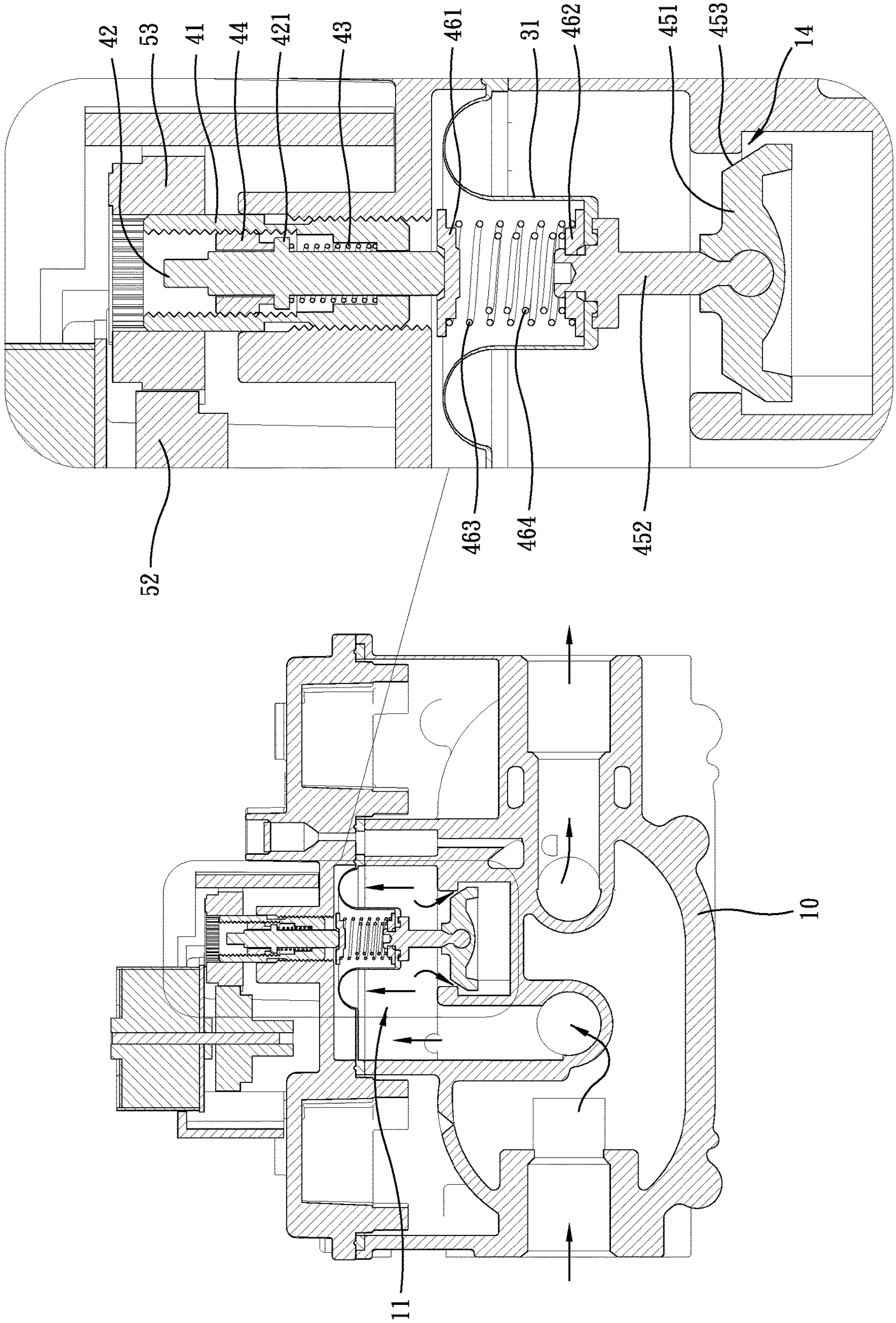
FIG. 6 is a cross-sectional view of the embodiment of FIG. 1, primarily for illustrating operation with natural gas in a small flame state.
Figure 10:
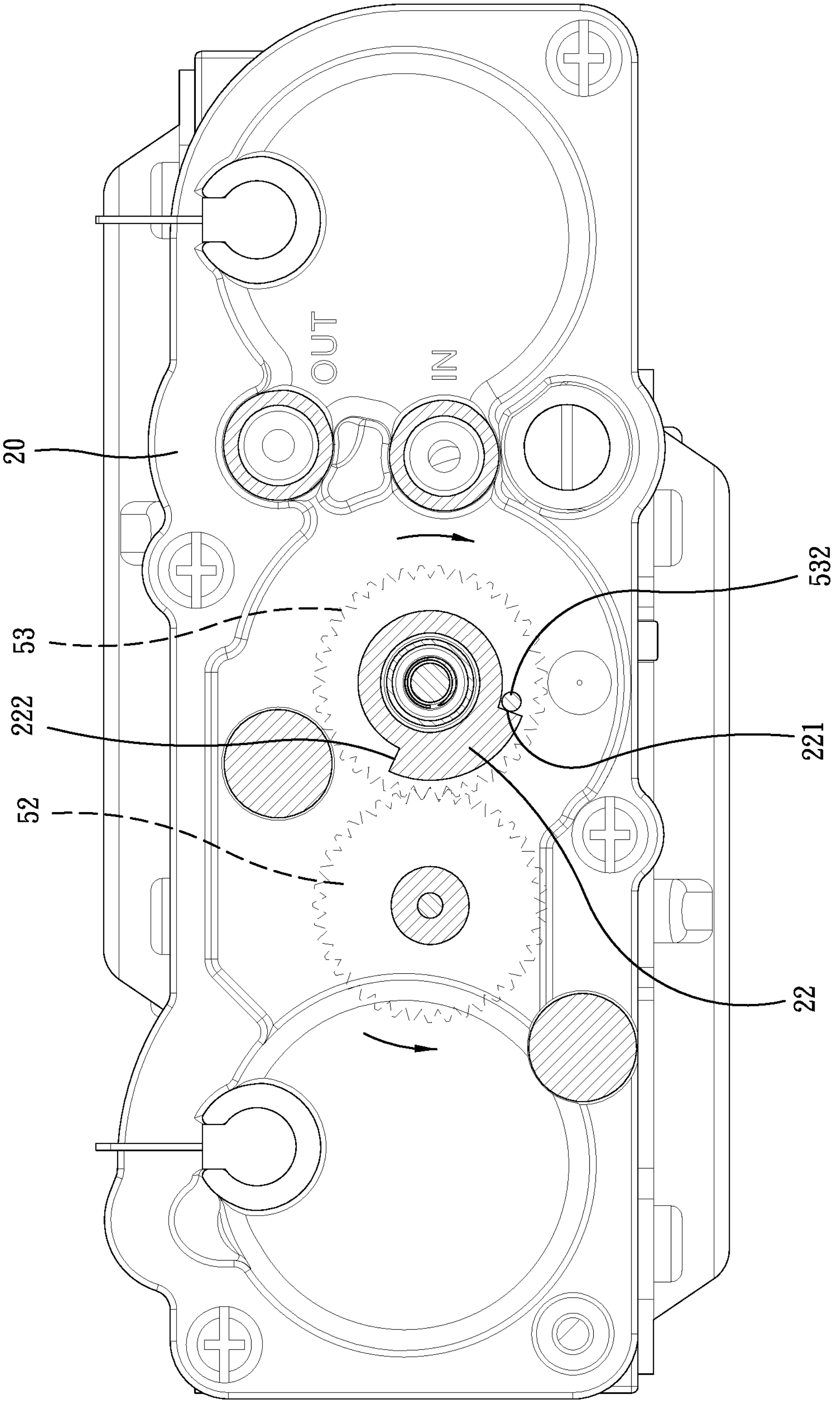
FIG. 10 is a cross-sectional view of the embodiment of FIG. 1, primarily for illustrating a small flame state.

With the flow channel 11 of the valve body 10 being opened, in case that the user attempts to use natural gas as the fuel gas, with the switching device 60 being not coupled with the regulation device 40, for the user attempting to adjust down to a state of small flame, the drive interface 50 provides a rotating force in a rotating direction, meaning the step motor 51 drives the driving gear 52 to rotate and the driven gear 53 simultaneously drives the intermediary member 41 to rotate until the limiting peg 532 contacts the small flame limiting portion 221 (as shown in FIG. 10), and at this moment, the intermediary member 41 is acted upon by the rotating power provided from the drive interface 50 to move upwards and simultaneously drives the pin axle 42, the dual-spring unit 46, and the plug axle unit 45 to move upwards (as shown in FIG. 6), causing the closure face 453 of the plug axle unit 45 to approach the internal wall of the valve opening 14, namely reducing a passage through which the fuel gas flows through the valve opening 14, so that a flow rate of the fuel gas is reduced and is discharged through the outlet opening 13 to keep the small flame state.

Figure 7:
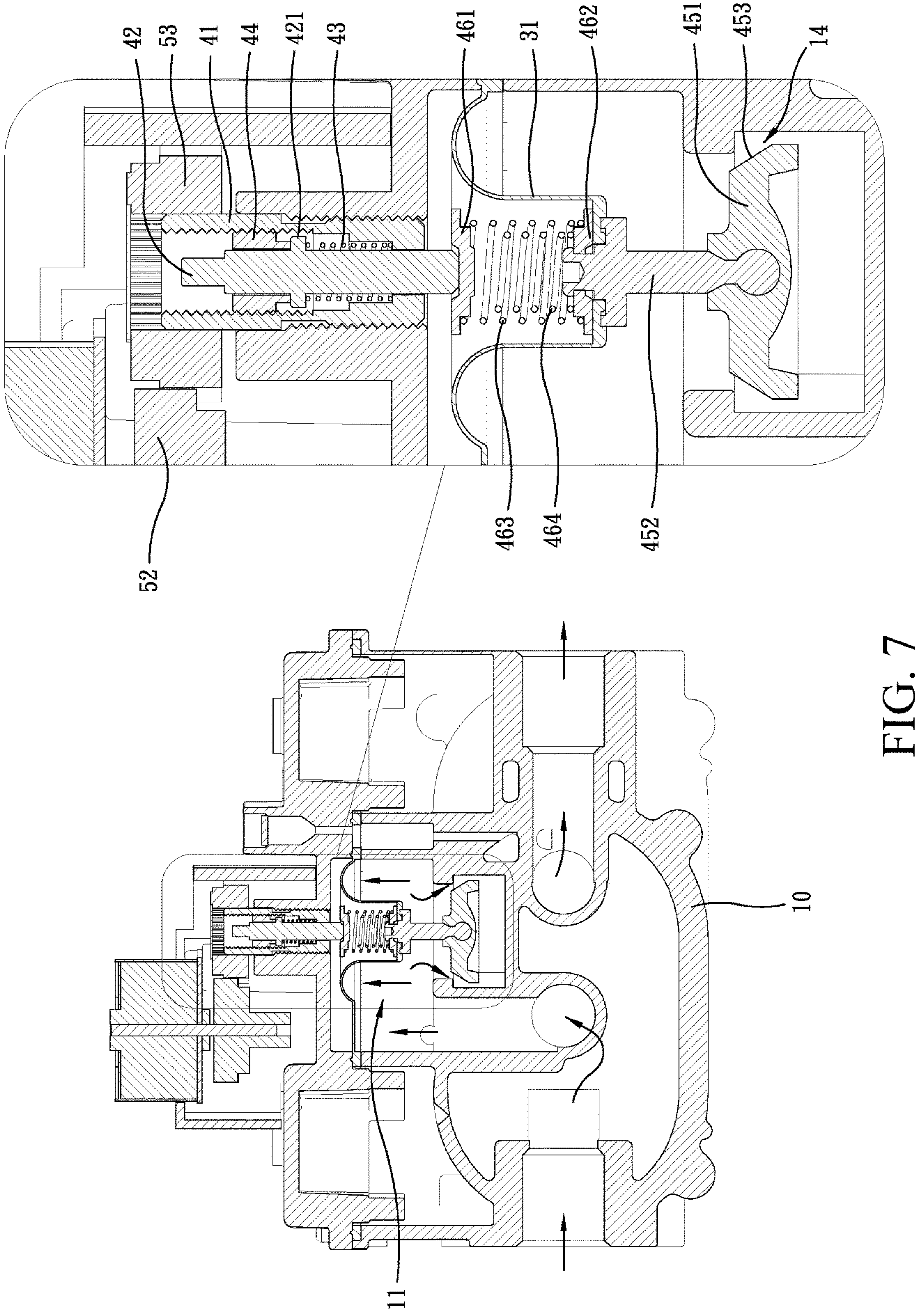
FIG. 7 is a cross-sectional view of the embodiment of FIG. 1, primarily for illustrating operation with natural gas in a large flame state.
Figure 11:
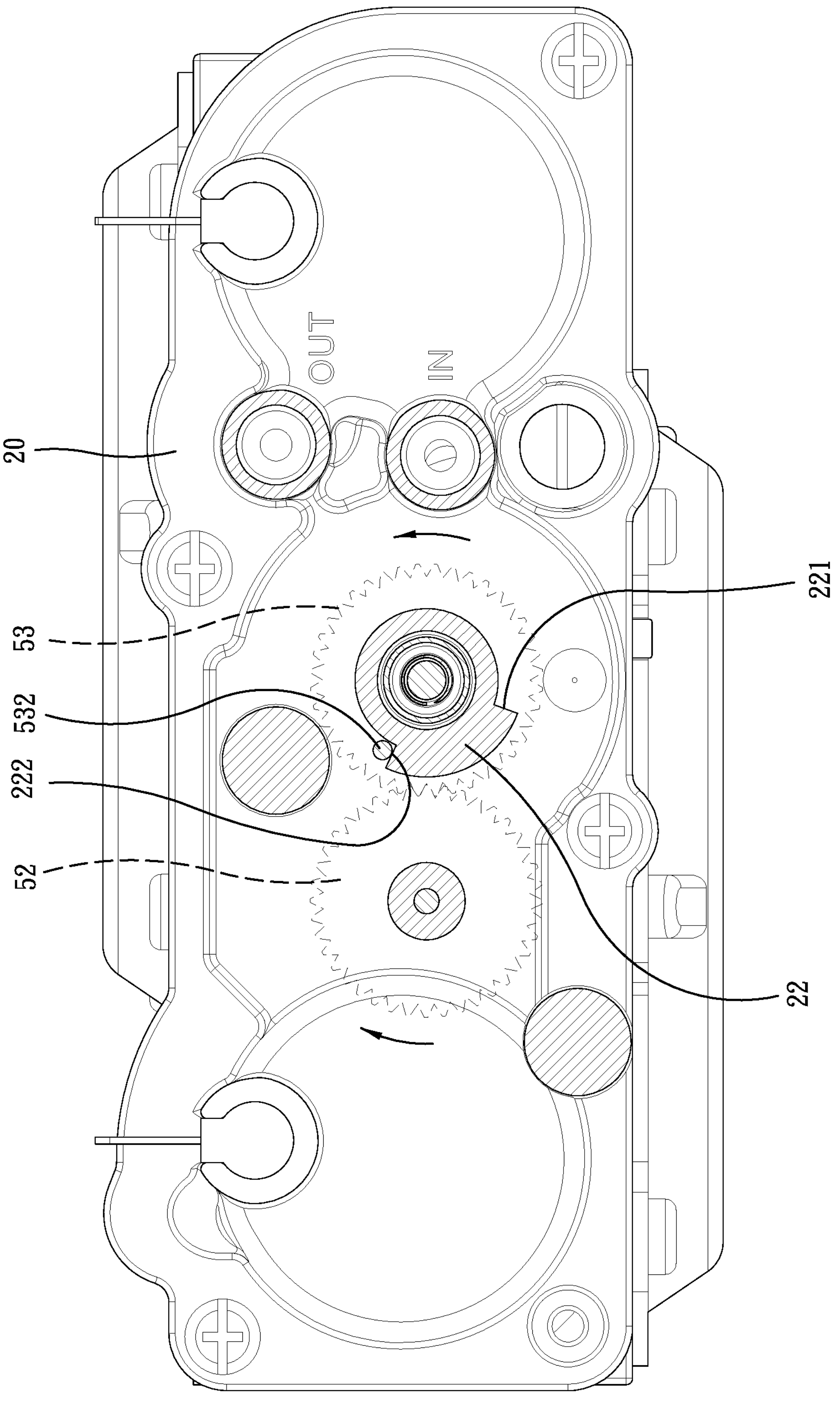
FIG. 11 is a cross-sectional view of the embodiment of FIG. 1, primarily for illustrating a large flame state.

With the flow channel 11 of the valve body 10 being opened, in case that the user attempts to use natural gas as the fuel gas, with the switching device 60 being not coupled with the regulation device 40, for the user attempting to adjust up to a state of large flame, the drive interface 50 provides a rotating force in an opposite rotating direction, meaning the step motor 51 drives the driving gear 52 to rotate in an opposite direction and the driven gear 53 simultaneously drives the intermediary member 41 to rotate until the limiting peg 532 contacts the large flame limiting portion 222 (as shown in FIG. 11), and at this moment, the intermediary member 41 is acted upon by the rotating power provided from the drive interface 50 to move downwards and simultaneously drives the pin axle 42, the dual-spring unit 46, and the plug axle unit 45 to move downwards (as shown in FIG. 7), causing the closure face 453 of the plug axle unit 45 to move away from the internal wall of the valve opening 14, namely expanding the passage through which the fuel gas flows through the valve opening 14, so that the flow rate of the fuel gas is increased and is discharged through the outlet opening 13 to keep the large flame state.

At this moment, due to the elastic acting force of the external spring 463, the fuel gas that enters the inlet opening 12 and has a 7-inch water column gas pressure maintains a 1.7 (small flame)-3.5 (large flame)-inch water column gas pressure at the outlet opening 13 to suit the needs for operation.

Then, when the flow channel 11 of the valve body 10 is opened, for the user attempting to use liquefied petroleum gas as the fuel gas, it needs to set the switching device 60 to couple with the intermediary member 41 of the regulation device 40, namely the external-knob external thread 611 of the external knob 61 is screwed to and coupled with the intermediary-member internal thread 412 of the intermediary member 41, so that the internal knob 62 of the switching device 60 pushes the pin axle 42 to move downwards to compress the spring 43, and also to compressing the internal spring 464 of the dual-spring unit 46 to apply a force to the deformable portion 31 of the sealing gasket 30 to cause deformation of the deformable portion 31 for reducing a volume of the flow channel 11 in this area and thereby increasing the gas pressure of the liquefied petroleum gas that passes over the deformable portion 31 to flow out of the outlet opening 13.

Figure 8:
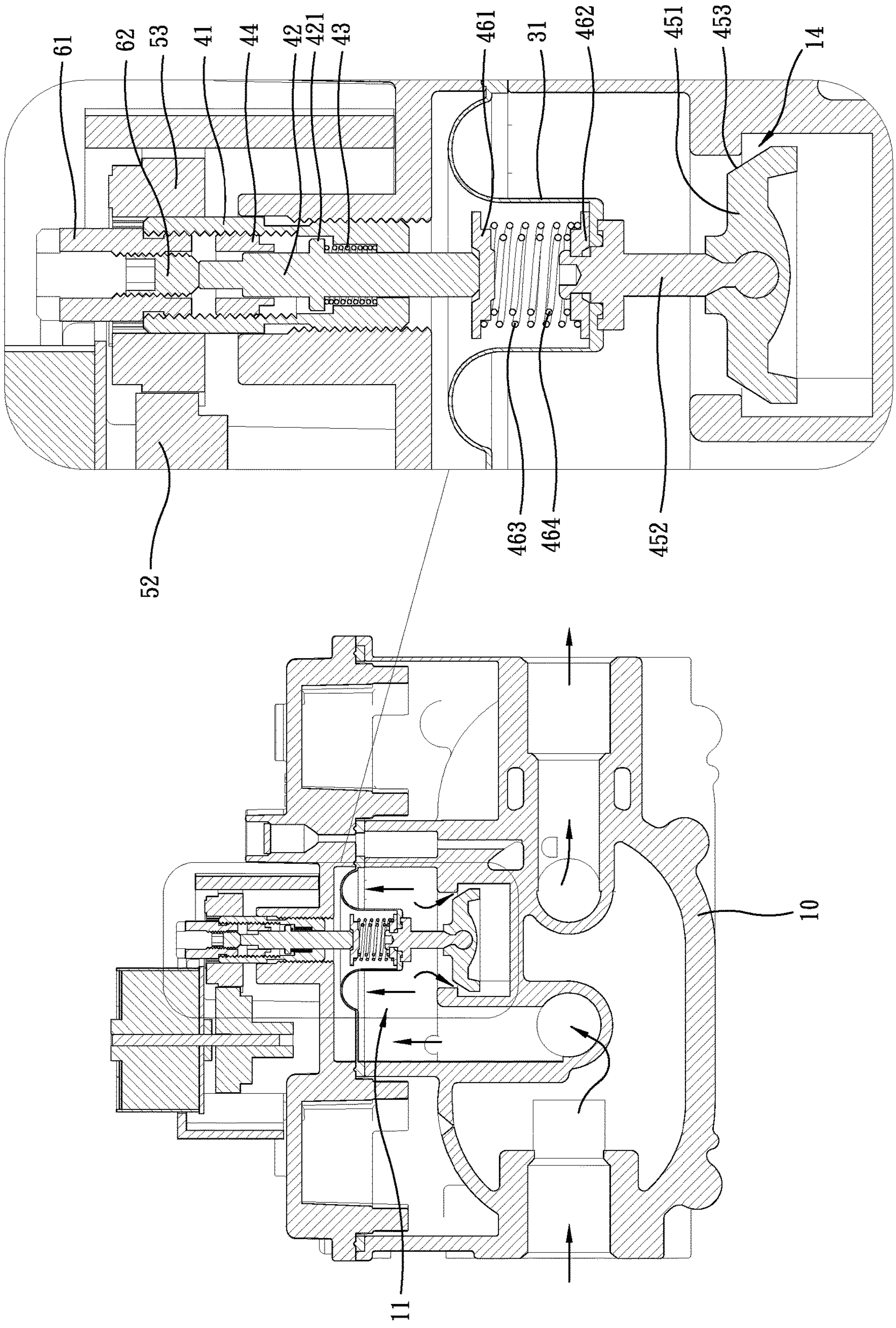
FIG. 8 is a cross-sectional view of the embodiment of FIG. 1, primarily for illustrating operation with liquefied petroleum gas in a small flame state.

Next, when the user attempts to make adjustment down to a small flame state, the drive interface 50 provides a rotating force in a rotating direction, meaning the step motor 51 drives the driving gear 52 to rotate and the driven gear 53 simultaneously drives the intermediary member 41 to rotate until the limiting peg 532 contacts the small flame limiting portion 221 (as shown in FIG. 10), and at this moment, the intermediary member 41, as being acted upon by the rotating power provided from the drive interface 50, moves upwards and simultaneously drives the pin axle 42, the dual-spring unit 46, and the plug axle unit 45 to move upwards (as shown in FIG. 8), causing the closure face 453 of the plug axle unit 45 to approach the internal wall of the valve opening 14, namely reducing a passage through which the fuel gas flows through the valve opening 14, so that the flow rate of the fuel gas is reduced and is discharged through the outlet opening 13 to keep the small flame state.

Figure 9:
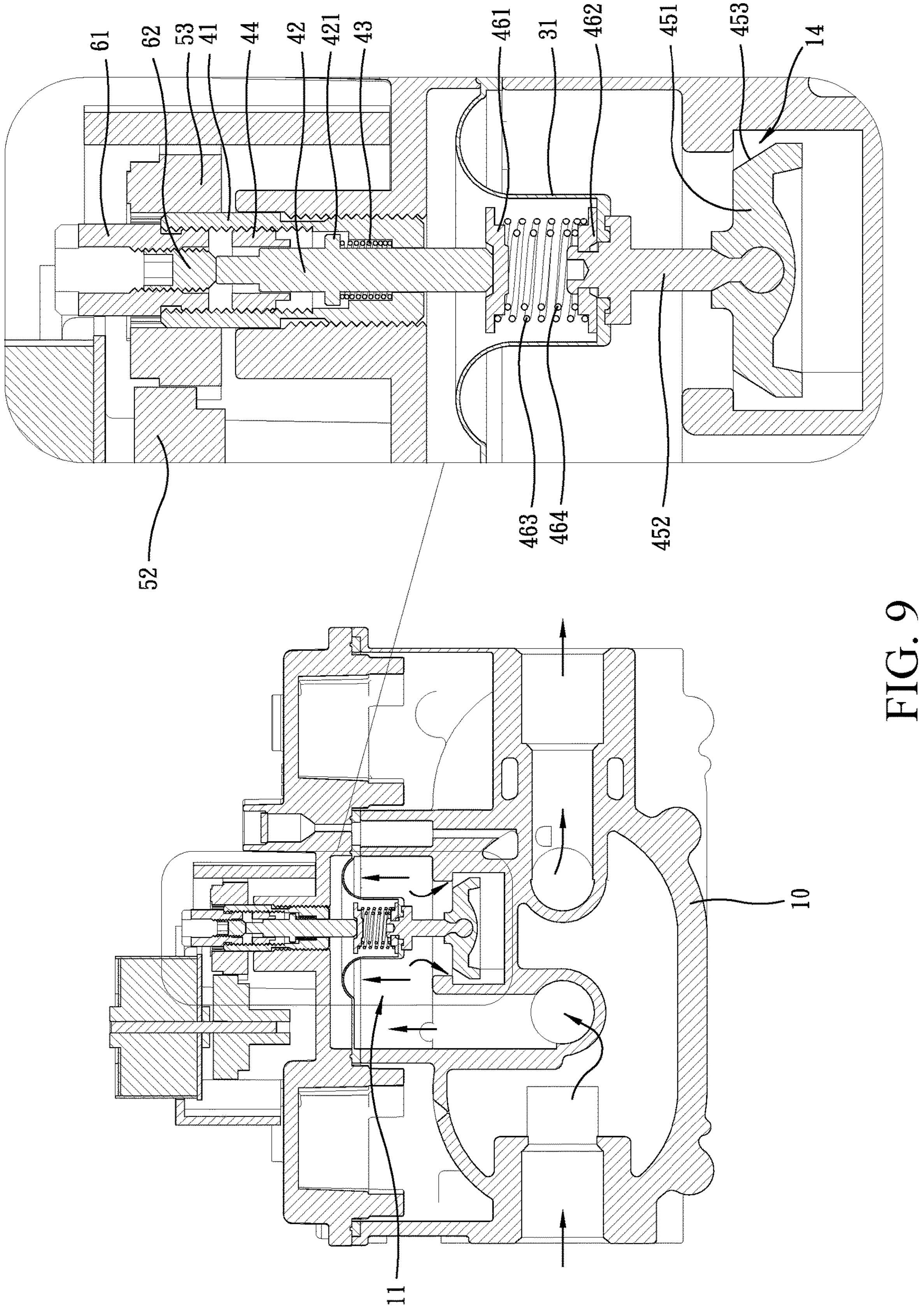
FIG. 9 is a cross-sectional view of the embodiment of FIG. 1, primarily for illustrating operation with liquefied petroleum gas in a large flame state.

For the user attempting to use liquefied petroleum gas as the fuel gas and attempting to make adjustment up to a large flame state, the drive interface 50 provides a rotating force in an opposite rotating direction, meaning the step motor 51 drives the driving gear 52 to rotate in an opposite direction and the driven gear 53 simultaneously drives the intermediary member 41 to rotate until the limiting peg 532 contacts the large flame limiting portion 222 (as shown in FIG. 11), and at this moment, the intermediary member 41 is acted upon by the rotating power provided from the drive interface 50 to move downwards and simultaneously drives the pin axle 42, the dual-spring unit 46, and the plug axle unit 45 to move downwards (as shown in FIG. 9), causing the closure face 453 of the plug axle unit 45 to move away from the internal wall of the valve opening 14, namely expanding the passage through which the fuel gas flows through the valve opening 14, so that the flow rate of the fuel gas is increased and is discharged through the outlet opening 13 to keep the large flame state.

Thus, coupling the switching device 60 to the intermediary member 41 of the regulation device 40 causes deformation of the deformable portion 31 of the sealing gasket 30 and the deformation induced on the deformable portion 31 makes the volume of the flow channel 11 in this area reduced to increase the gas pressure of the liquefied petroleum gas that passes over the deformable portion 31 to flow out of the outlet opening 13. In other words, with the switching device 60 coupled to the intermediary member 41 of the regulation device 40, the elastic acting force of the external spring 463 and the internal spring 464 allows the fuel gas that enters the inlet opening 12 and has a 12-inch water column gas pressure to maintain at a 5-5.5 (small flame) to 10-10.5 (large flame) inch water column gas pressure when flowing out of the outlet opening 13 to suit the needs for operation.

In this way, the present invention enables adjustment between a small flame and a large flame and also utilizes the situation where the switching device 60 is coupled to the intermediary member 41 of the regulation device 40 or not to achieve switching of operation with liquefied petroleum gas or the natural gas. As such, the present invention has a simple structure, involves a reduced number of parts, is easy to assemble and operate, and can effectively reduce the production cost to allow for easy operation by a user and to greatly improve market competition power.

Figure 2:
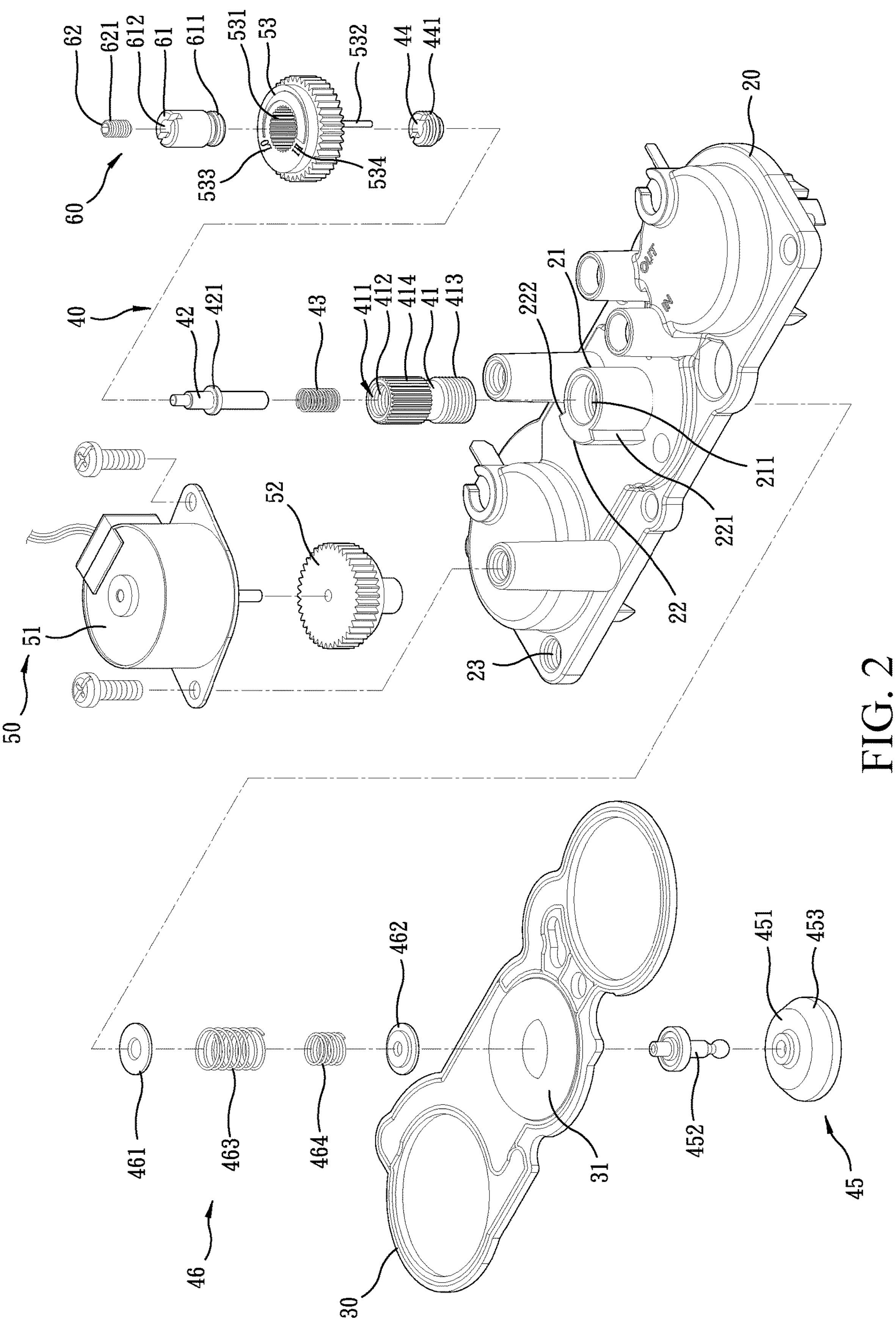
FIG. 2 is an exploded view showing a portion of the embodiment shown in FIG. 1.
Figure 3:
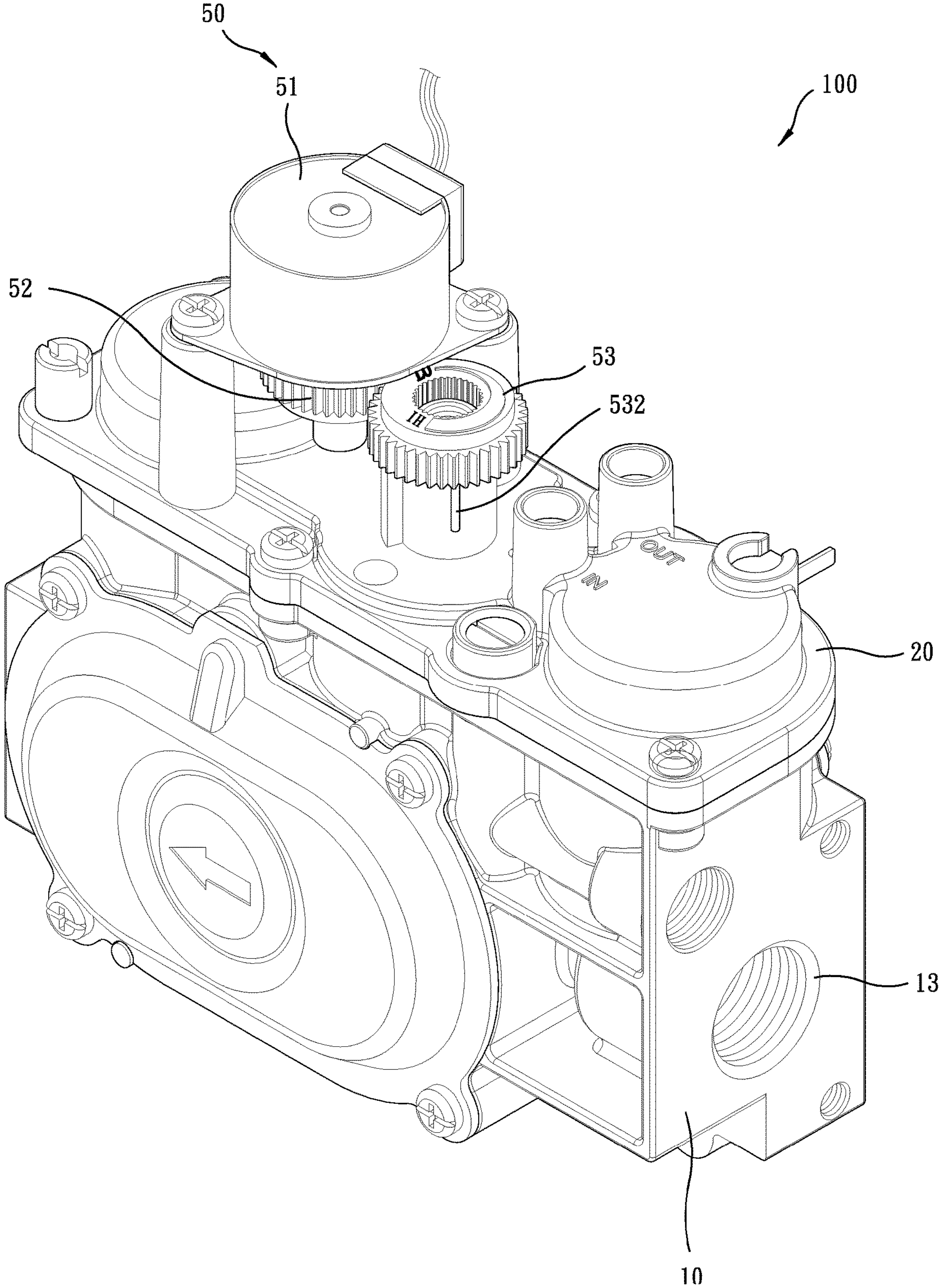
FIG. 3 is a perspective view showing the embodiment of FIG. 1 in an assembled state.
Figure 12:
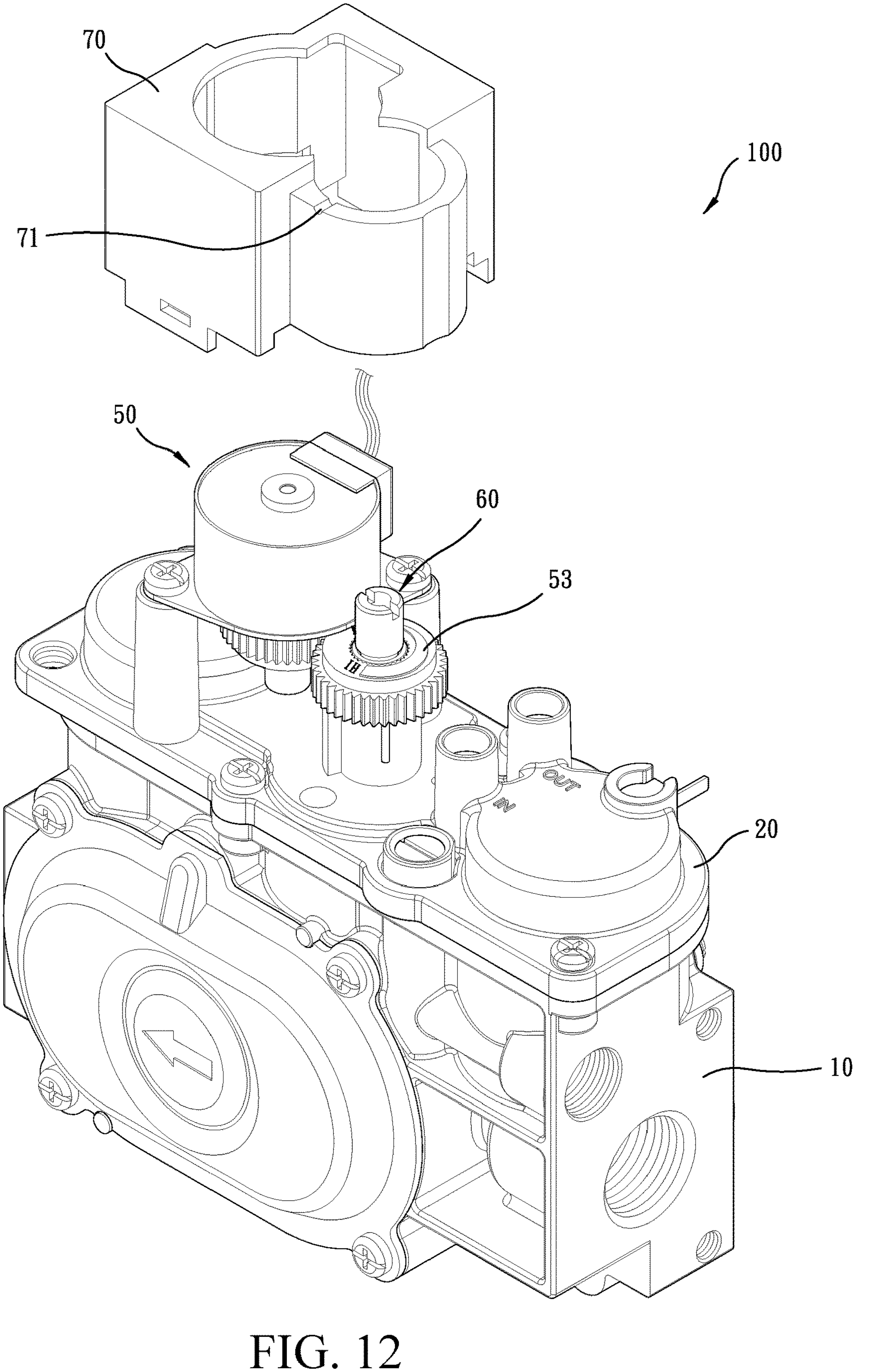
FIG. 12 is an exploded view showing another form of embodiment of the present invention.
Figure 13:
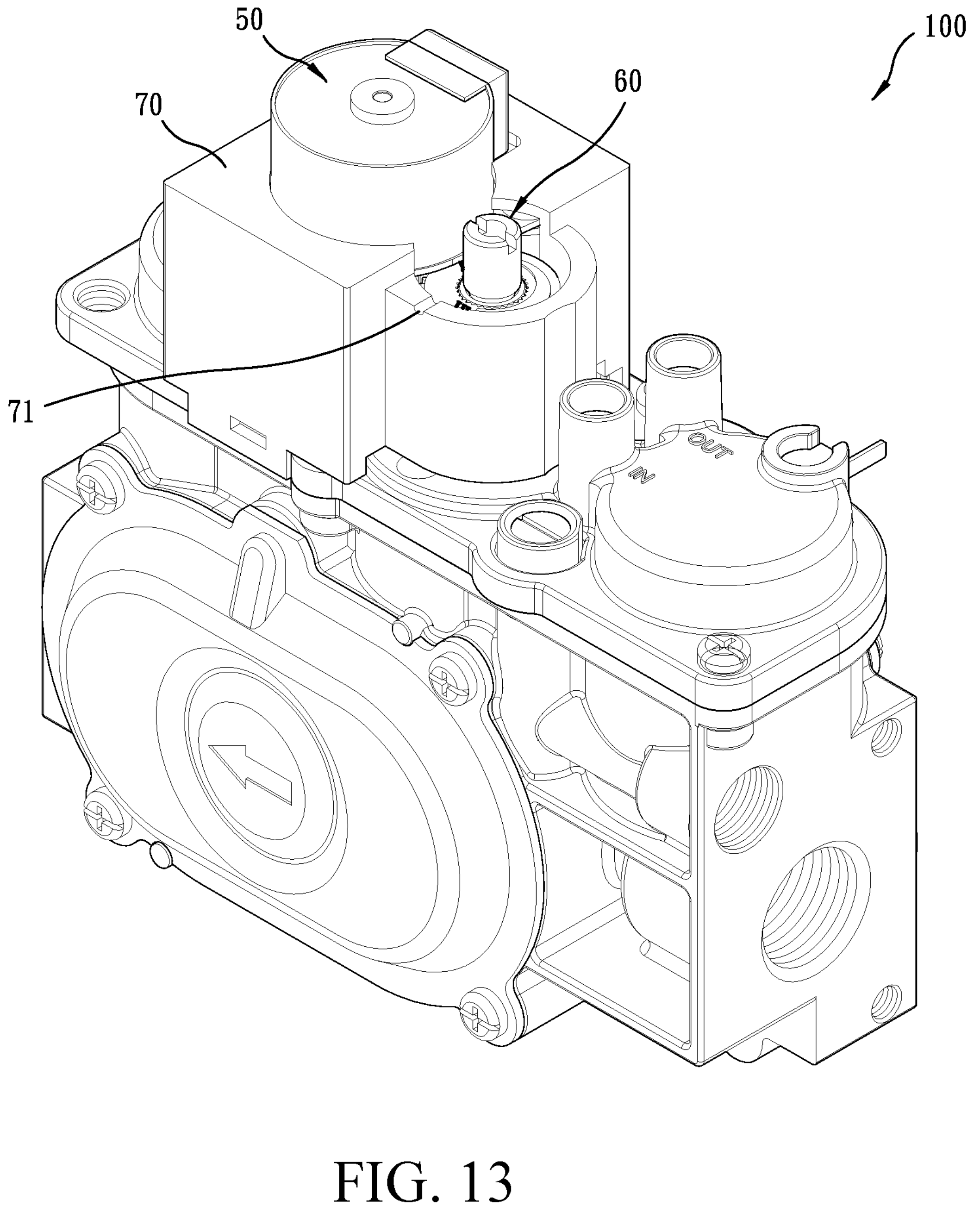
FIG. 13 is a perspective view showing the form of embodiment of FIG. 12 in an assembled state.

Further, as shown in FIGS. 12, 13, and 2, the present invention may further comprise a protection cover 70. The protection cover 70 is mounted on the top cover 20. The protection cover 70 comprises an indication mark 71, and the driven gear 53 of the drive interface 50 is provided with a small flame mark (LO) 533 and a large flame mark (HI) 534, as shown in FIG. 2, to allow the user to identify the small/large flame state according a relative position of the indication mark 71 with respect to the small flame mark 533 and the large flame mark.

Figure 14:
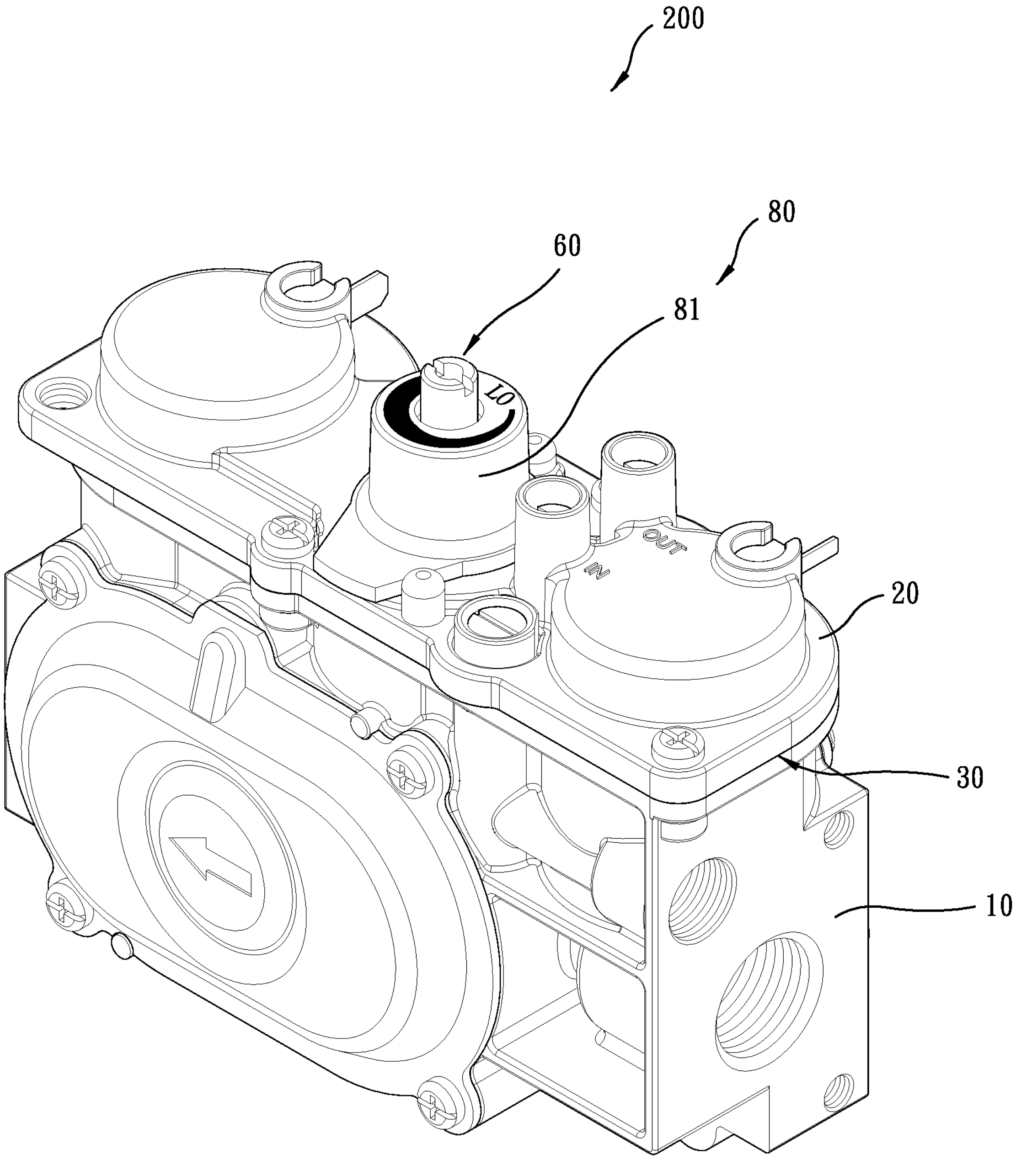
FIG. 14 is a perspective view showing a second embodiment of the present invention.

Referring to FIG. 14, a fuel gas valve 200 applicable to natural gas and liquefied petroleum gas according to a second embodiment of the present invention is provided, which is generally similar to the above embodiment and comprises a valve body 10, a top cover 20, a sealing gasket 30, a regulation device (not shown in the drawing), a drive interface 80, and a switching device 60, and a primary difference is as follows:

In the instant embodiment, the drive interface 80 is a manually-operating rotary knob 81, which is disposed on the top cover 20 and is coupled to the regulation device 40 to allow a user to rotate, with a hand, for adjusting the small flame and large flame state in order to suit the needs of operation for different users.

I claim:

1. A fuel gas valve applicable to natural gas and liquefied petroleum gas, comprising:

a valve body, which comprises a flow channel formed in an interior thereof, an inlet opening adapted to communicate the flow channel with an outside, and an outlet opening adapted to communicate the flow channel with the outside in order to allow a fuel gas to flow in through the inlet opening to pass through the flow channel to then flow out of the outlet opening, a valve opening being arranged in an interior of the flow channel;

a top cover, which is mounted on the valve body and comprises a mounting hole, a small flame limiting portion, and a large flame limiting portion, the mounting hole being formed with a top-cover internal thread;

a sealing gasket, which is interposed between the valve body and the top cover, the sealing gasket comprising a deformable portion located in the flow channel;

a regulation device, which comprises an intermediary member, a pin axle, a spring, a fine adjustment knob, a plug axle unit, and a dual-spring unit, wherein the intermediary member is formed with an axle hole penetrating therethrough in an axial direction, the axle hole being formed, on an inside wall surface thereof, with an intermediary-member internal thread, the intermediary member being formed, on an external circumferential surface, with an intermediary-member external thread and an intermediary-member external circumferential toothed portion, the intermediary member being located in the mounting hole by having the intermediary-member external thread screwed to the top-cover internal thread, the pin axle being formed, in a middle section thereof, with a circumferential protrusion portion protruded in an annular form, the pin axle being located in the axle hole of the intermediary member, the spring being located in the axle hole of the intermediary member and having a top end supported on a bottom surface of the circumferential protrusion portion of the pin axle and a bottom end supported on an internal wall of the intermediary member to provide the pin axle with an upward-biasing elastic preloading force, the fine adjustment knob comprising a fine-adjustment-knob external thread, the fine-adjustment-knob external thread being screwed to the intermediary-member internal thread to have the fine adjustment knob located inside the axle hole and contact a top surface of the circumferential protrusion portion of the pin axle to limit a highest position of the pin axle, the plug axle unit being located in the valve opening of the valve body, the plug axle unit having an external circumferential surface that comprises a closure face, the dual-spring unit comprising an upper holding plate, a lower holding plate, an external spring, and an internal spring, the upper holding plate being supported on a bottom end of the pin axle, the lower holding plate being mounted to a top end of the plug axle unit, the lower holding plate and the plug axle unit jointly clamping a deformable portion of the sealing gasket therebetween, the external spring being connected between the upper holding plate and the lower holding plate, the internal spring being located in an interior of the external spring, a bottom end of the internal spring being supported on the lower holding plate;

a drive interface, which is disposed on the top cover and comprises a limiting projection, the drive interface being connected to the intermediary member of the regulation device to drive the regulation device to move upwards and downwards for changing a size of a gap between the closure face of the plug axle unit and the valve opening to adjust a flow rate of the fuel gas flowing through the valve opening for adjustment between a small flame and a large flame, the small flame limiting portion and the large flame limiting portion of the top cover being located in a rotation path of the limiting projection; and a switching device, which comprises an external knob and an internal knob, an external circumferential surface of the external knob being formed with an external-knob external thread, an internal circumferential surface of the external knob being formed with an external-knob internal thread, the internal knob comprising an internal-knob external thread, the internal-knob external thread being screwed to the external-knob internal thread to couple the internal knob in an interior of the external knob, the switching device being selectively detachable for rearrangement to have the external-knob external thread screwed to the intermediary-member internal thread of the intermediary member, such that the switching device, when coupled with the intermediary member, drives the pin axle and the external spring and the internal spring to be pressed for downward moving to cause deformation of the deformable portion of the sealing gasket to change a volume of the flow channel to achieve adjustment of a pressure of the fuel gas flowing out of the outlet opening.

2. The fuel gas valve applicable to natural gas and liquefied petroleum gas according to claim 1, wherein the top cover comprises a receiving internal thread for receiving the external-knob external thread of the switching device to detachably screw thereto.

3. The fuel gas valve applicable to natural gas and liquefied petroleum gas according to claim 1, wherein the plug axle unit comprises a regulation plug and a connecting bar, the closure face being formed on an external circumferential surface of the regulation plug, a bottom end of the connecting bar being connected to a top surface of the regulation plug, a top end of the connecting bar being fixed to the lower holding plate.

4. The fuel gas valve applicable to natural gas and liquefied petroleum gas according to claim 1, wherein the drive interface comprises a step motor, a driving gear, and a driven gear, the step motor being disposed on the top cover to provide power for rotation, the driving gear being coupled to the step motor to be driven by the step motor to rotate, the driven gear comprising an internal circumferential toothed portion, the internal circumferential toothed portion being in mating engagement with the intermediary-member external circumferential toothed portion of the intermediary member, the driven gear being in mating engagement with the driving gear, the limiting projection being provided on a bottom surface of the driven gear at a non-center position.

5. The fuel gas valve applicable to natural gas and liquefied petroleum gas according to claim 4, further comprising a protection cover, the protection cover being mounted on the top cover, the protection cover comprising an indication mark, the driven gear of the drive interface being provided with a small flame mark and a large flame mark.

6. The fuel gas valve applicable to natural gas and liquefied petroleum gas according to claim 1, further comprising a protection cover, the protection cover being mounted on the top cover, the protection cover comprising an indication mark, the driven gear of the drive interface being provided with a small flame mark and a large flame mark.

7. The fuel gas valve applicable to natural gas and liquefied petroleum gas according to claim 1, wherein the drive interface comprises a manually-operating rotary knob disposed on the top cover and connected to the intermediary member of the regulation device.

* * * * *